Dec. 8, 1942.   H. A. MAEDER   2,304,737
MASS CLAMP FOR GRAVITY METERS
Filed March 6, 1940   2 Sheets-Sheet 1
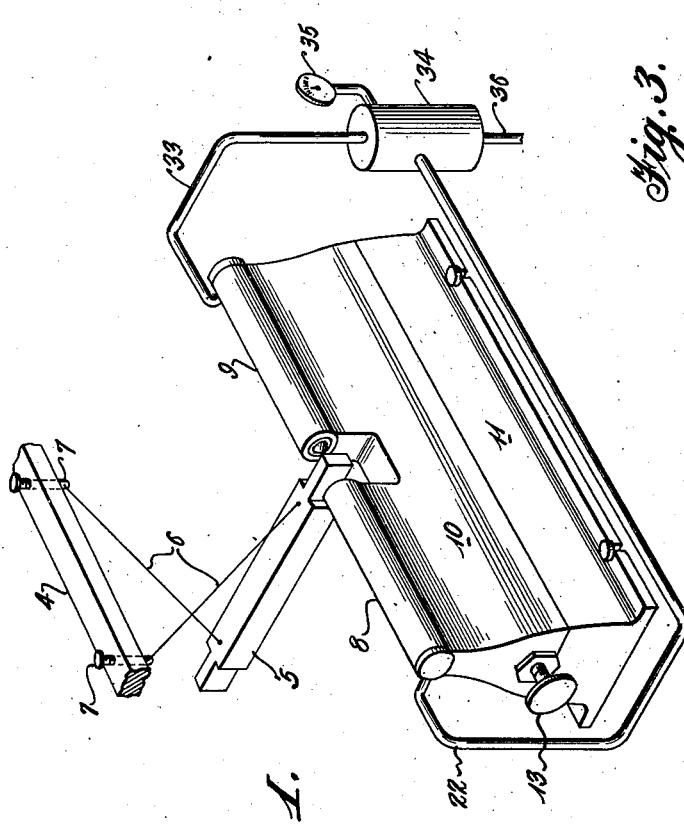
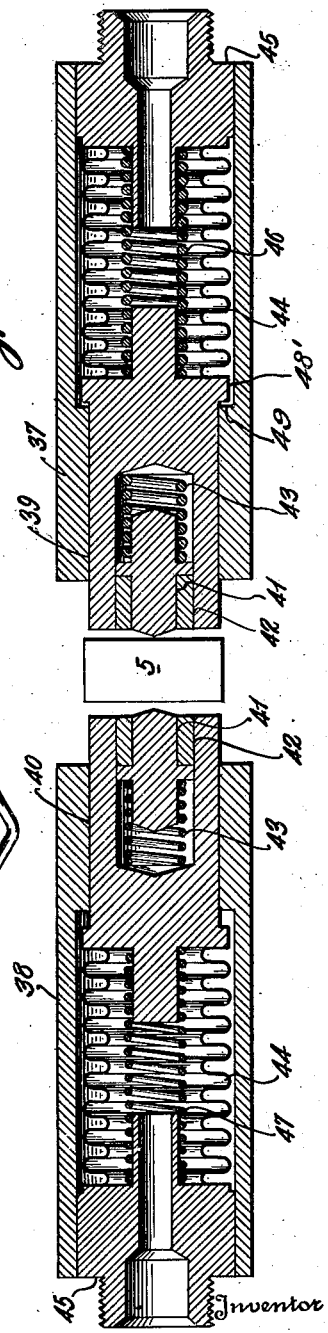
Inventor
Henry A. Maeder
By Myron J. Burbach
Attorney

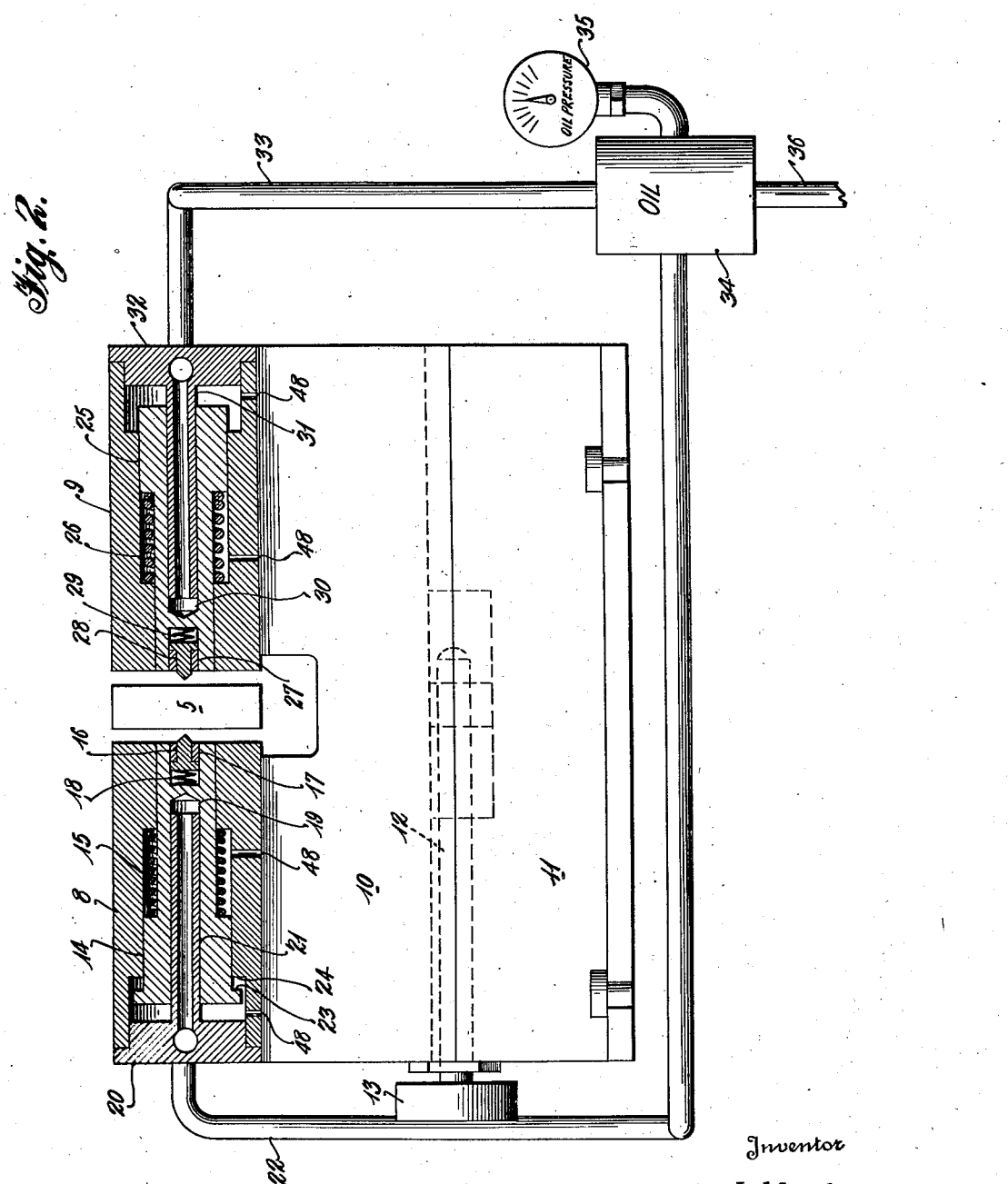

Patented Dec. 8, 1942

2,304,737

UNITED STATES PATENT OFFICE 2,304,737

MASS CLAMP FOR GRAVITY METERS

Henry A. Maeder, Dallas, Tex., assignor, by mesne assignments, to Socony-Vacuum Oil Company, Incorporated, New York, N. Y., a corporation of New York Application March 6, 1940, Serial No. 322,497

3 Claims. (Cl. 265—1.4)

This invention relates to hydraulic clamps and more particularly to hydraulic clamps for gravity meter masses.

In making a geophysical survey using a gravity meter which includes a mass bar suspended at the end of a torsion member or members, it is customary to set up the meter at a first or original base station, adjust the torsion members to the critical point and calibrate the instrument. The meter is then moved to various other stations and a reading taken at each station without, of course, further adjustment of the torsion members. These readings vary but slightly and are taken in tenths of millidynes. It has been found that unless the mass is held absolutely rigid during transportation of the meter, the physical characteristics of the torsion member or members are altered sufficiently to render the readings useless. It is therefore necessary to provide a clamp for the mass bar that will rigidly hold the mass so that the torsion elements will be protected.

By the present invention the mass bar of a gravity meter is clamped in such a manner that it will be positively held against vibration when moving the instrument from one place to another. Briefly the clamp includes a pair of clamping members located on opposite sides of the bar and adapted to be forced against the bar by hydraulic pressure, one of the members being limited in its travel by stops which allow it to move just far enough to center the bar. The member having the stops is opposed by a weaker spring than the other member and consequently, upon application of hydraulic pressure, the first member will be moved against its stop before the other member is moved. Because of the superior moving force exerted on the aforementioned first member, it will be held against its stop throughout the period of clamping. Means are also provided to prevent sticking of the mass bar to the clamping surfaces and thus violent disturbance of the bar upon its release is avoided.

It is an object of the present invention to provide means for rigidly clamping an article such as a gravity meter mass.

Another object is the provision of a gravity meter having hydraulically operated means for clamping the mass in such a manner that it will be positively held against vibration relative to the housing.

It is a further object of the invention to provide a clamp which includes means designed to prevent the clamped article from adhering to the clamping surface upon release thereof.

An additional object is to provide a clamp which includes a pair of opposed hydraulically operated pistons with means to control their operation whereby an article will always be clamped in the same position relative to the cylinders containing said pistons.

Another object is the provision of a hydraulic clamp having a pair of opposed pistons in which means are included to adjust the position of the pistons relative to the fixed base of the clamp.

Further objects and advantages will become apparent in the following description of the invention with reference to the accompanying drawings in which:

Figure 1 is an isometric view of the invention as applied to a gravity meter of the bifilar type.

Figure 2 is an elevation of the clamp partially broken away to show the details of the piston assemblies; and Figure 3 is a section view showing an alternate piston assembly.

In Figure 1 a gravity meter is shown as including a support 4 which is mounted on the meter housing (not shown). The bar mass 5 is suspended from the support 4 by torsion members 6 which are secured to adjusting elements 7 carried by the support. The elements 7 have been adjusted in a manner well known to the art to position bar 5 as shown so that it will move a short distance vertically in response to variations in the force of gravity. Other details of the meter such as the reading mechanism are well known and are here omitted since they are unnecessary for a complete disclosure of the invention.

One end of bar 5 extends between the adjacent ends of a pair of axially aligned, horizontal cylinders 8 and 9. These cylinders are mounted on or formed as part of a movable base 10, (Figures 1 and 2) with the adjacent ends of the cylinders being spaced to permit the bar 5 to hang freely when unclamped. Movable base 10 is slidably mounted on a fixed base 11 which is secured to the meter housing (not shown) and the two bases are connected by adjusting screw 12 which is operated by handle 13. Rotation of the adjusting screw will thus shift the cylinders axially and thereby free hanging of bar 5 when it is in its operating position may be assured.

Referring now to Figure 2, a piston 14 is positioned within cylinder 8 and is normally held in the position shown by spring 15. A pin 16 is slidably mounted in a bushing 17 carried in the right end of piston 14. This pin is normally held in the position shown, with its rounded or pointed end extending slightly past the flat face of the piston, by spring 18. Piston 14 has an axial bore 19 and the cylinder cap 20 has a tubular portion 21 slidably fitted into said bore. The tubular portion 21 is connected to an oil line 22 and thus when oil passes therethrough into the cylinder under pressure, piston 14 will be moved to the right against the force of spring 15. A shoulder 23 on the left end of piston 14 will engage shoulder 24 on the cylinder wall to limit movement of the piston to the right.

Another piston 25 is located within cylinder 9 and held in the position shown by spring 26. The left end of piston 25 is equipped with a bushing 27, pin 28, and spring 29 similar to those in the right end of piston 14. Piston 25 also has an axial bore 30 into which is slidably fitted a tubular portion 31 of cylinder cap 32. Oil line 33 is connected to tubular portion 31 and thus when oil passes therethrough into the cylinder under pressure, piston 25 will be moved to the left.

Drains 48 are provided in both cylinders to remove any oil which may have leaked out of the pistons. Oil lines 22 and 33 are both connected to chamber 34 which is equipped with a pressure gauge 35 and an inlet 36 for receiving oil from a pressure source.

When it is desired to clamp the bar 5 in place, oil is fed through chamber 34 and lines 22 and 33 to cylinders 8 and 9. Now the piston springs are so constructed that spring 15 is weaker than spring 26. Then as the oil pressure is applied, piston 14 will be operated first and moved to the right until shoulder 23 engages shoulder 24. Thereafter, piston 25 will be moved to the left and the bar 5 will be engaged on opposite sides by pins 16 and 28. Springs 18 and 29 will then be compressed allowing the flat end faces of the two pistons to firmly clamp the flat sided bar 5 between them. It is to be noted that movement of piston 25 to the left is limited only by the compression length of spring 26 and therefore sufficient movement is available to clamp the bar. It will also be seen that since spring 15 is weaker than spring 26, equal oil pressure in the two pistons will result in a greater resultant force on piston 14 to hold it with shoulder 23 against shoulder 24. Consequently bar 5 will be clamped each time in the same position relative to the cylinders.

When it is desired to release bar 5, the oil pressure is removed whereupon springs 15 and 26 force their respective pistons back to normal positions. In order to hold bar 5 rigidly, it is imperative that the flat end faces of the pistons engaging the flat sides of the bar be of an appreciable area. However, when the bar is to be released it will tend to adhere or stick to the clamping faces. If plain end faces were used on the pistons, the sticking of the bar would result in a jerking or sudden horizontal swinging thereof when actually released. Considerable time would then be consumed in waiting for the bar to become stationary before taking a reading. The present invention overcomes this difficulty by the provision of pins 16 and 28. Examination of the drawings will disclose that when the end faces of the piston break away from the bar, pins 16 and 28 still remain in engagement with the bar holding it steady. As the pistons move further toward their normal positions, the pins will be removed from the bar but their smaller area and lower pressure because of the weak springs 18 and 29 will preclude any substantial sticking of the bar thereto. In addition, the position of the cylinders relative to the end of the bar may be adjusted by screw 12 so that the bar will be clamped in approximately the same position it held when free. As a consequence, swinging of the bar upon its release will be reduced to a minimum.

A different construction is illustrated in Figure 3 which discloses a pair of cylinders 37 and 38 which may replace cylinders 8 and 9 in Figure 2. Within cylinders 37 and 38 are pistons 39 and 40, respectively. Each of these pistons has a pin 41, bushing 42 and spring 43 in its clamping end, serving the same purpose as described for pins 16 and 28, bushings 17 and 27, and springs 18 and 29 in Figure 2. A bellows 44 connects each piston with its cylinder cap 45 to form a flexible, oil tight chamber, the caps, of course, being adapted for connection to a common oil supply to feed oil under pressure to the interior of the bellows. A spring 46 extends from piston 39 to its cap and tends to move piston 39 to the left. Another spring 47 tends to move piston 40 to the right. However, the natural spring of the bellows hold their respective pistons in the positions shown. In this construction, spring 46 is made stronger than spring 47. Consequently, when the oil pressure is applied, piston 39 will be operated first and moved to the left until stop 48' on the piston strikes shoulder 49 of the cylinder. Thereafter, piston 40 will be moved to the right and clamping and releasing of the bar will proceed as set forth hereinbefore with reference to Figure 2.

Although the present invention has been illustrated and described as applied to a gravity meter of the bifilar type, it is obvious that it can be used with a meter having a single torsion member and that other applications thereof can be made. It is the intention, therefore, to limit the scope of the invention only as set forth in the attached claims.

I claim:

1. In a clamp, a pair of spaced clamping members, each having a surface for engaging the article to be clamped, means for moving each of said members toward the other including a system for exerting equal hydraulic pressure on said members, individual spring means associated with each member in opposition to said hydraulic pressure, said individual spring means being of unequal strength, whereby one of said members will move prior to the other, means for limiting the total movement of said prior moving member, and means yieldably projecting from said engaging surfaces of the clamping members for engaging the article to be clamped.

2. In a clamp, a pair of spaced clamping members, each having a surface for engaging the article to be clamped, means for moving each of said members toward the other including a system for exerting equal hydraulic pressure on said members, individual spring means associated with each member in opposition to said hydraulic pressure, said individual spring means being of unequal strength, whereby one of said members will move prior to the other, means for limiting the total movement of said prior moving member, means yieldably projecting from said engaging surfaces of the clamping members for engaging the article to be clamped, and resilient means for resisting the movement of the yieldably projecting means in a direction away from the article to be clamped.

3. In a clamp, a pair of spaced clamping members, means for moving each of said members toward the other including a system for exerting equal hydraulic pressure on said members, individual spring means associated with each member in opposition to said hydraulic pressure, said individual spring means being of unequal strength, whereby one of said members will move prior to the other, and means for limiting the total movement of said prior moving member.

HENRY A. MAEDER.